(12) United States Patent
Perry et al.

(10) Patent No.: US 8,109,081 B2
(45) Date of Patent: Feb. 7, 2012

(54) HYDROCARBON SELECTIVE CATALYTIC REDUCTION FOR NOX CONTROL WITH GASOLINE-FUELED SPARK IGNITION ENGINES USING ENGINE-OUT HYDROCARBONS

(75) Inventors: Kevin L. Perry, Fraser, MI (US); Thompson M. Sloane, Oxford, MI (US); Norman D. Brinkman, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 12/468,268

(22) Filed: May 19, 2009

(65) Prior Publication Data

US 2010/0293926 A1 Nov. 25, 2010

(51) Int. Cl.
 *F01N 3/00* (2006.01)
(52) U.S. Cl. ............... 60/286; 60/295; 60/274; 701/104
(58) Field of Classification Search ............... 60/285, 60/286, 301, 303; 123/299, 676, 406.47, 123/406.26; 701/102, 103, 104, 113, 114, 701/115
See application file for complete search history.

(56) References Cited

U.S. PATENT DOCUMENTS

| | | | |
|---|---|---|---|
| 6,311,484 B1 * | 11/2001 | Roth et al. | 60/301 |
| 7,533,518 B2 * | 5/2009 | Kurtz et al. | 60/285 |
| 2006/0064228 A1 * | 3/2006 | Huang | 701/104 |
| 2007/0107416 A1 * | 5/2007 | Udono et al. | 60/284 |
| 2008/0066454 A1 * | 3/2008 | Viola | 60/286 |
| 2008/0066456 A1 * | 3/2008 | Schmieg et al. | 60/286 |

OTHER PUBLICATIONS

Masuda "Silver-promoted catalyst for removal of nitrogen oxides from emission of diesel engines." May 4, 1995.
Satokawa "Promotion effect of H2 on the low temperature activity of the selective reduction of NO by light hydrocarbons over Ag/Al2O3" Jun. 11, 2002.
Amiridis "Selective catalytic reduction of nitric oxide by hydrocarbons" Jan. 18, 1996.
Shimizu "Effects of hydrogen and oxygenated hydrocarbons on the activity and SO2-tolerance of Ag/Al2O3 for selective reduction of NO" Jan. 6, 2006.
Shimizu "Catalytic performance of Ag—Al2O3 catalyst for the selective catalytic reduction of NO by higher hydrocarbons" Aug. 26, 1999.
Eranen "Continuous reduction of NO with octane over a silver/alumina catalyst in oxygen-rich exhaust gases: combined heterogeneous and surface-mediated homogeneous reactions" Feb. 3, 2003.
Iliopoulou "Ag/alumina catalysts for the selective catalytic reduction of NOx using various reductants." Jun. 24, 2004.
Shimizu. "Selective catalytic reduction of NO over supported silver catalysts—practical and mechanistic aspects." Physical Chemistry Chemical Physics 8, p. 2677 (2006).

(Continued)

*Primary Examiner* — Thomas Denion
*Assistant Examiner* — Patrick Maines

(57) ABSTRACT

A method for controlling hydrocarbon delivery to a hydrocarbon selective catalytic reduction device configured to receive an exhaust gas flow from an internal combustion engine includes monitoring measurable variable terms including factors affecting a conversion efficiency in the hydrocarbon selective catalytic reduction device, determining classifications of the measurable variable terms based upon measurable variable ranges, determining a desired hydrocarbon delivery value range based upon the classifications; and utilizing the desired hydrocarbon delivery value range to control the hydrocarbon delivery to the hydrocarbon selective catalytic reduction device.

16 Claims, 10 Drawing Sheets

OTHER PUBLICATIONS

T. Nakatsuji. "Catalytic reduction system of NOx in exhaust gases from diesel engines with secondary fuel injection." Applied Catalysis B: Environmental 17, 333 (1998).

K. Eranen. "Influence of hydrocarbons on the selective catalytic reduction of NOx over Ag/Al2O3—Laboratory and engine tests." SAE Paper No. 2000-01-2813.

T. Miyadera. "Selective reduction of NOx by ethanol on catalysts composed of Ag/Al2O3 and Cu/TiO2 without formation of harmful by-products." Applied. Catalyst. B 16, 155 (1998).

S. Kameoka. "Role of organic nitro compounds in selective reduction of NOx with ethanol over different supported silver catalysts." Catal. Lett. 51, 11 (1998).

S. Sumiya. "Reduction of lean NOx by ethanol over Ag/Al2O3 catalysts in the presence of H2O and SO2." Catal. Lett. 50, 87 (1998).

T. Noto. "Mechanism of NOx reduction by ethanol on a silver-base catalyst" SAE Paper No. 2001-01-1935.

M. D. Kass. "Selective catalytic reduction of NOx emissions from a 5.9 liter diesel engine using ethanol as a reductant." SAE Paper No. 2003-01-3244.

Y. Yu. "Mechanism of the selective catalytic reduction of NOx by C2H5OH over Ag/Al2O3." Appl Catal. B 49, 159 (2004).

J. F. Thomas. "Hydrocarbon selective catalytic reduction using a silver-alumina catalyst with light alcohols and other reductants." SAE Paper No. 2005-01-1082.

H. Dong. "An ethanol SCR for NOx purification: performance evaluation on engine bench and demonstration on bus." SAE Paper No. 2007-01-1240.

J. Sacks. "Design and analysis of computer experiments." Statistical Science 4, 409, 1989.

P. J. Digglel. "Model-based geostatistics." Applied Statistics 47, 299 (1998).

* cited by examiner

| T | NOx | SV | $O_2$ | C1(Engine-out)/NOx |
|---|---|---|---|---|
| low | low | low | low | 29-88 |
| low | low | low | high | 21-110 |
| low | low | high | low | 4-104 |
| low | low | high | high | 81-780 |
| low | high | low | low | 1-33 |
| low | high | low | high | 6-19 |
| low | high | high | low | 10-34 |
| low | high | high | high | 5-25 |
| high | low | low | low | 55-85 |
| high | low | low | high | 14-179 |
| high | low | high | low | 58-78 |
| high | low | high | high | 65-180 |
| high | high | low | low | 19-36 |
| high | high | low | high | 20-30 |
| high | high | high | low | 7-40 |
| high | high | high | high | 8-39 |

HYDROCARBON SELECTIVE CATALYTIC REDUCTION FOR NOX CONTROL WITH GASOLINE-FUELED SPARK IGNITION ENGINES USING ENGINE-OUT HYDROCARBONS

TECHNICAL FIELD

This disclosure is related to exhaust aftertreatment systems for internal combustion engines.

BACKGROUND

The statements in this section merely provide background information related to the present disclosure and may not constitute prior art.

Operating an internal combustion engine under lean of stoichiometry conditions can improve fuel efficiency, but may increase nitrides of oxygen (NOx) emissions. Such engines include both compression-ignition and lean-burn spark-ignition engines. Aftertreatment devices are known, for instance, utilizing catalysts to treat the exhaust gas flow and catalysts capable of storing some amount of NOx (NOx traps, NOx adsorbers). Engine control technologies have been developed to combine these NOx traps or NOx adsorbers with fuel efficient engine control strategies to improve fuel efficiency and still achieve acceptable levels of NOx emissions. One exemplary strategy includes using a NOx trap to store NOx emissions during fuel lean operations and then purging the stored NOx during fuel rich, higher temperature engine operating conditions with conventional three-way catalysis to nitrogen and water. However, catalysts and NOx traps are dependent upon properties of the exhaust gas to operate efficiently. These methods can be temperature and engine range limiting. A selective catalytic reduction device (SCR) is known to additionally treat the exhaust gas flow utilizing a reductant, extending the aftertreatment capabilities of the aftertreatment system.

One known configuration of SCR utilizes ammonia derived from urea injection or recovered from normal operation of a three-way catalyst device as a reductant to treat NOx. Another known configuration utilizes a hydrocarbon selective catalytic reduction device (HC-SCR), wherein unburnt hydrocarbons, either injected in the exhaust gas flow or carried through from the combustion chamber, are utilized as a reductant to treat NOx. In either method, accurate dosing of the reductant is important to proper function of the device.

SUMMARY

A method for controlling hydrocarbon delivery to a hydrocarbon selective catalytic reduction device configured to receive an exhaust gas flow from an internal combustion engine includes monitoring measurable variable terms including factors affecting a conversion efficiency in the hydrocarbon selective catalytic reduction device, determining classifications of the measurable variable terms based upon measurable variable ranges, determining a desired hydrocarbon delivery value range based upon the classifications; and utilizing the desired hydrocarbon delivery value range to control the hydrocarbon delivery to the hydrocarbon selective catalytic reduction device.

BRIEF DESCRIPTION OF THE DRAWINGS

One or more embodiments will now be described, by way of example, with reference to the accompanying drawings, in which.

DETAILED DESCRIPTION

Figure 1:
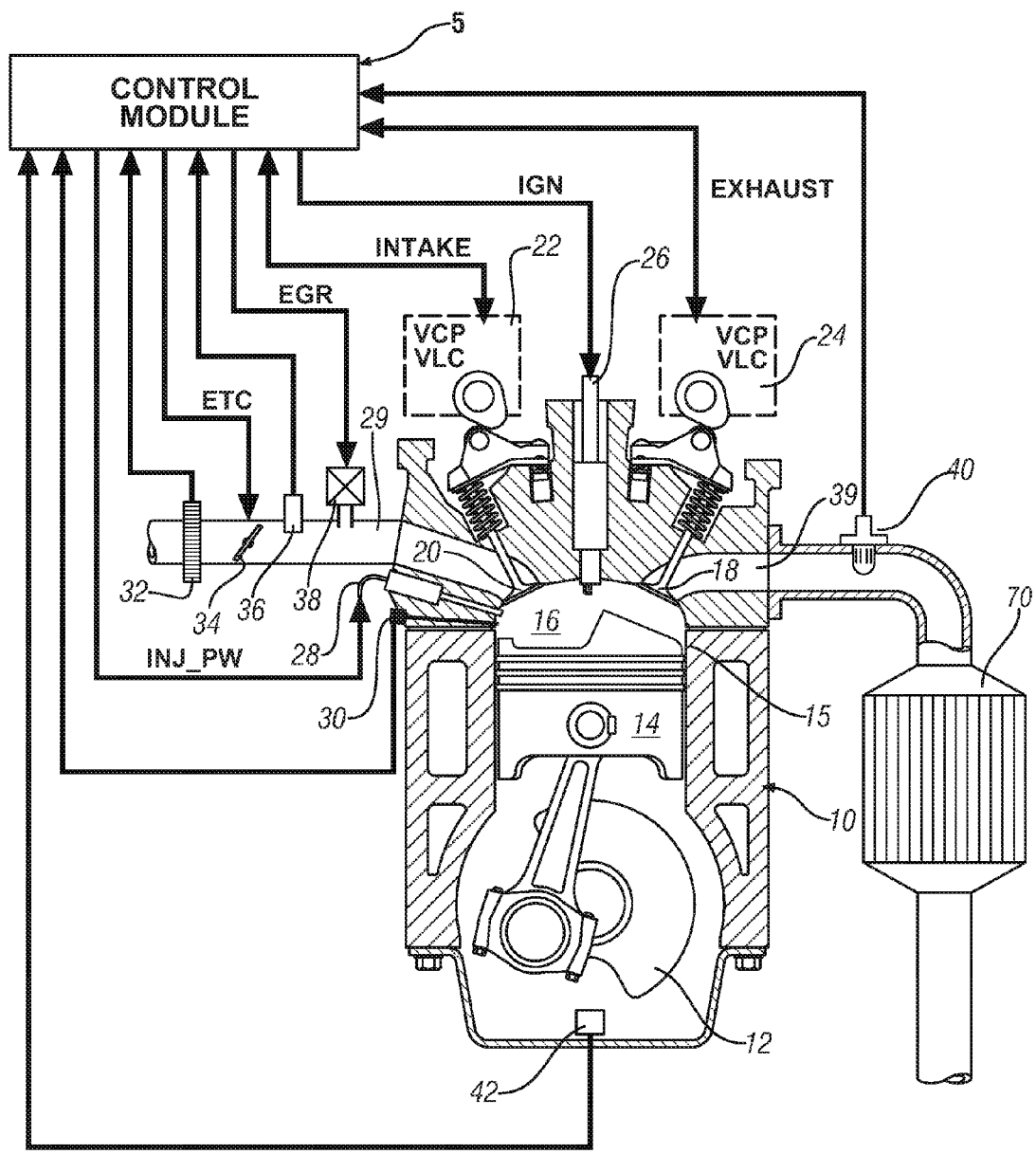
FIG. 1 is a schematic drawing of an exemplary engine system, in accordance with the present disclosure.

Referring now to the drawings, wherein the showings are for the purpose of illustrating certain exemplary embodiments only and not for the purpose of limiting the same, FIG. 1 schematically shows an internal combustion engine 10, an accompanying control module 5, and an exhaust aftertreatment system 70 that have been constructed in accordance with an embodiment of the disclosure. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation (EGR) valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (VLC) devices. The variable lift control devices are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 for example through camshaft rotation position sensors for the intake camshaft and the exhaust camshaft.

The intake and exhaust VCP/VLC systems 22 and 24 have limited ranges of authority over which opening and closing of the intake and exhaust valves 18 and 20 can be controlled. VCP systems can have a range of phasing authority of about 60°-90° of cam shaft rotation, thus permitting the control module 5 to advance or retard opening and closing of one of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into one of the combustion chambers 16, in response to a signal from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output (RPM) and operative to monitor crankshaft rotational position, i.e., crank angle and speed including a crankshaft rotational speed sensor 42, a combustion sensor 30 adapted to monitor combustion and an exhaust gas sensor 40 adapted to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing includes negative valve overlap (NVO) and lift of exhaust valve reopening (in an exhaust re-breathing strategy). The control module 5 is adapted to receive input signals from an operator (e.g., a throttle pedal position and a brake pedal position) to determine an operator torque request and from the sensors indicating the engine speed and intake air temperature, and coolant temperature and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. The control module 5 can operate to turn the engine on and off during ongoing vehicle operation, and can operate to selectively deactivate a portion of the combustion chambers or a portion of the valves through control of fuel and spark and valve deactivation.

The aftertreatment system 70 is fluidly connected to the exhaust manifold 39 and signally and operatively connected to the control module 5. Exemplary aftertreatment system 70 includes an HC-SCR device. The exhaust aftertreatment system 70 can comprise combinations of catalytic and/or trap devices operative to oxidize, adsorb, desorb, reduce, and combust elements of the exhaust gas feedstream. Catalytic devices may include one or more three-way catalytic converter(s) (TWC) and SCR device(s). Trap devices may include one or more NOx adsorber (LNT) device(s) downstream of the catalytic devices.

Exemplary HC-SCR catalysts may include alumina catalysts, silver-alumina ($Ag/Al_2O_3$) catalysts, barium- and sodium-yttria zeolite catalysts, ion-exchanged base metal zeolite catalysts (e.g., Cu-ZSMS), and platinum-group metal catalysts (e.g., $Pt/Al_2O_3$). In one embodiment the HC-SCR device comprising a silver based catalyst includes between 2 and 3 wt. % $Ag_2O$ supported on alumina. The selected HC-SCR catalyst is incorporated with a suitable washcoat for impregnation upon a ceramic or metal substrate having flow-through characteristics, e.g., a honeycomb configuration. The substrate comprises a ceramic or metal monolith formed from cordierite with a cell density about 62 to 96 cells per square centimeter (400-600 cells per square inch), and a wall thickness about three to seven mils. The cells of the substrate comprise flow passages through which exhaust gas flows to contact the catalytically active materials. The impregnated substrate is assembled into a stainless steel metal assembly having an inlet and an outlet, to form the HC-SCR device. The HC-SCR device has physical characteristics including size, volume, space velocity and flow restriction appropriate to the specific engine and vehicle to which it is applied. One having ordinary skill in the art will appreciate that HC-SCR devices reduce NOx emissions under oxygen-rich conditions according to the process described by the following equation.

$$HC+O_2+NO_x \rightarrow N_2+CO_2+H_2O \qquad [1]$$

Figure 2:
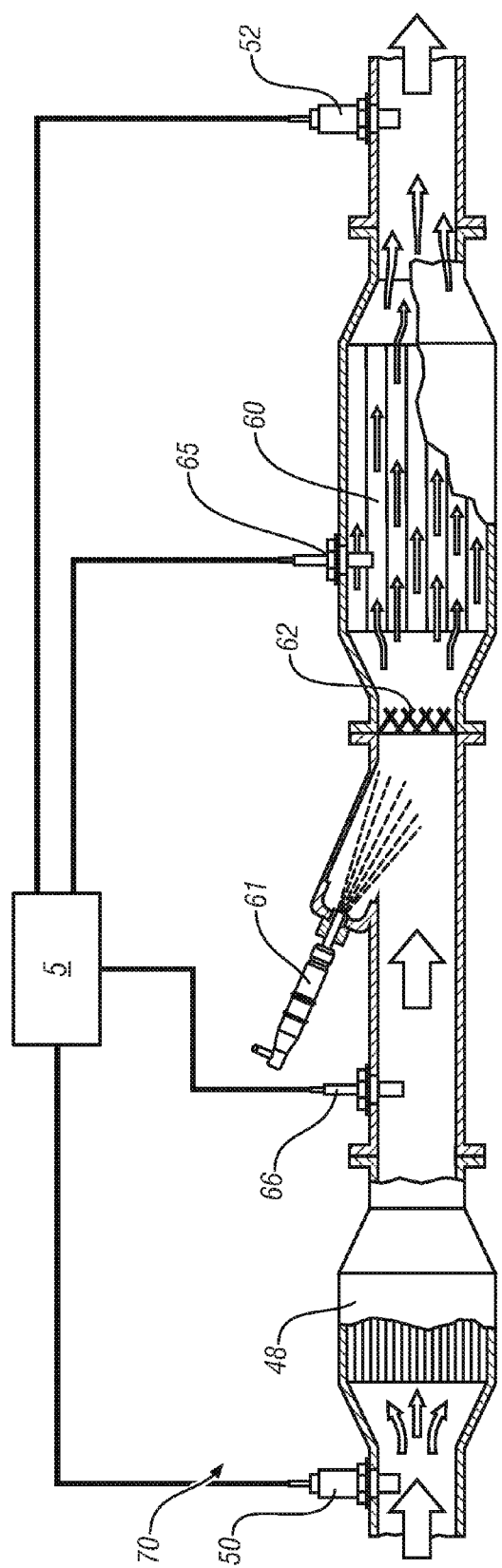
FIG. 2 schematically illustrates an exemplary aftertreatment system including a hydrocarbon dosing module, in accordance with the present disclosure.

FIG. 2 schematically illustrates an exemplary aftertreatment system including an HC-SCR device configuration, in accordance with the present disclosure. Aftertreatment system 70 comprises TWC 48, HC-SCR device 60, upstream NOx sensor 50, upstream oxygen sensor 66, downstream NOx sensor 52, SCR catalyst temperature sensor 65, and fuel dosing module 61 and communicates with control module 5. As is known in the art, the TWC 48 performs a number of catalytic functions necessary for aftertreatment of an exhaust gas flow. The HC-SCR device 60 utilizes fuel as a reactant to reduce NOx into nonpolluting molecules. Upstream NOx sensor 50 detects and quantifies NOx in the exhaust gas flow entering aftertreatment system 70. While the upstream NOx sensor 50 is illustrated as an exemplary means to quantify NOx entering the aftertreatment system, it should be noted that NOx entering the system can be quantified for use in evaluating conversion efficiency in an HC-SCR by other means, for example, through a NOx sensor located between TWC 48 and HC-SCR device 60. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. The HC-SCR device 60 utilizes hydrocarbons to convert NOx to nonpolluting molecules by methods known in the art. The temperature sensor 65 is depicted, located within the HC-SCR device 60 in order to provide a temperature of the catalyst bed within the device, i.e., a catalyst bed temperature. It will be appreciated that a temperature sensor elsewhere in the aftertreatment system 70, in combination with other metrics indicative of heat transfer within the device and the reaction occurring therein, could be used to estimate the resulting temperature of the catalyst. The fuel dosing module 61 is depicted in a position upstream of the HC-SCR device 60. The fuel can be directly sprayed into the exhaust gas flow entering the HC-SCR device 60. However, a preferred method is depicted, utilizing a mixer device 62. The fuel dosing module 61 injects fuel onto the mixer device 62, and the fuel is then carried by the exhaust gas flow in a substantially even distribution onto the catalyst surfaces on the interior of the HC-SCR device 60. Fuel dosing module 61 is an exemplary device for delivering hydrocarbons to the aftertreatment system. However, one having skill in the art that many embodiments of a fuel delivery system could be employed to deliver hydrocarbons to the exhaust gas feedstream. In another exemplary embodiment, the combustion cycle parameters can be adjusted to create more unburnt hydrocarbons in the exhaust gas stream. The downstream NOx sensor 52 detects and quantifies NOx in the exhaust gas flow exiting the aftertreatment system 70. The control module 5 includes programming required to process inputs related to the aftertreatment system 70 and control parameters in the treatment of NOx in the system.

By placing NOx sensors before and after an aftertreatment device, an estimation can be made regarding the effectiveness of the device in converting the NOx. The exemplary aftertreatment system described above describes a measured or estimated NOx content of the exhaust gas flow measured upstream of the aftertreatment device being analyzed. This measure of NOx entering the aftertreatment system can be described at any time as x(t). The exemplary aftertreatment system described above describes a measured or estimated NOx content of the exhaust gas flow measured downstream of the aftertreatment device being analyzed. This measure of NOx exiting the aftertreatment system can be described at any time as y(t). Conversion efficiency at any given time by the following equation:

$$\eta_{ACTUAL}(t) = 1 - \frac{y(t)}{x(t)} \qquad [2]$$

It will be appreciated that this equation provides the conversion efficiency at any instant in time. Such instantaneous measurements or calculations are prone to error based upon signal noise. Methods to apply a low pass filter are known in the art. An integration of x(t) or y(t) yields a description of a quantity of actual NOx to enter or exit the aftertreatment system through a time period, respectively. An exemplary equation to determine an integrated conversion efficiency, filtering anomalous measurements in x(t) and y(t), can be described as follows:

$$\eta_{ACTUAL} = 1 - \frac{\int y(t) * dt}{\int x(t) * dt} \qquad [3]$$

In this way, measured or estimated values of NOx entering and exiting the aftertreatment system can be utilized to determine an estimated or calculated actual conversion efficiency of the aftertreatment system 70.

The exemplary engine 10 can operate at stoichiometry, lean of stoichiometry and rich of stoichiometry. During engine operation, the engine 10 generates an exhaust gas feedstream containing regulated constituent elements to be transformed by the aftertreatment system, including hydrocarbons (HC), carbon monoxide (CO), nitrides of oxygen (NOx), and particulate matter (PM), among others. Operating the engine 10 rich and lean of stoichiometry produce varying proportions of the constituent elements.

Operating the engine 10 rich of stoichiometry can include injecting a first fuel pulse into the combustion chamber 16 during each compression stroke. The mass of fuel injected during the first fuel pulse is determined based upon an amount sufficient to operate the exemplary engine 10 to meet the operator torque request and other load demands. One or more subsequent fuel pulses can be injected into the combustion chamber 16 during the combustion cycle to generate an exhaust gas flow having an air/fuel ratio which is rich of stoichiometry, making HC available in the exhaust gas stream for use as a reductant. In the alternative or additionally, as depicted in FIG. 2, fuel can be directly injected into the exhaust gas flow using the fuel dosing module 61 to a similar effect, making HC available as a reductant. An additional embodiment comprises adjusting spark timing or fuel injection timing to effect a partial burn in the combustion chamber 16. The partial burn results in HC available in the exhaust gas stream thereby generating an exhaust gas flow having an air/fuel ratio which is rich of stoichiometry.

Operation of the HC-SCR device 60 depends upon the reaction facilitated by the catalyst within the device. This conversion efficiency of this reaction is dependent upon a number of variables. For instance, temperature within the device must be within an operable range for the reaction to take place, and temperature within the operable range can make the reaction more or less efficient. Similarly, space velocity of the gas moving through the device affects the efficiency of the reaction. Higher space velocities reduce the time in which the exhaust gas is operatively close to the catalyst, generally with reduced efficiency at higher space velocities. Additionally, one having ordinary skill in the art will appreciate that presence of appropriate quantities of component substances to the reaction are desired for efficient operation of the reaction.

Figure 3:
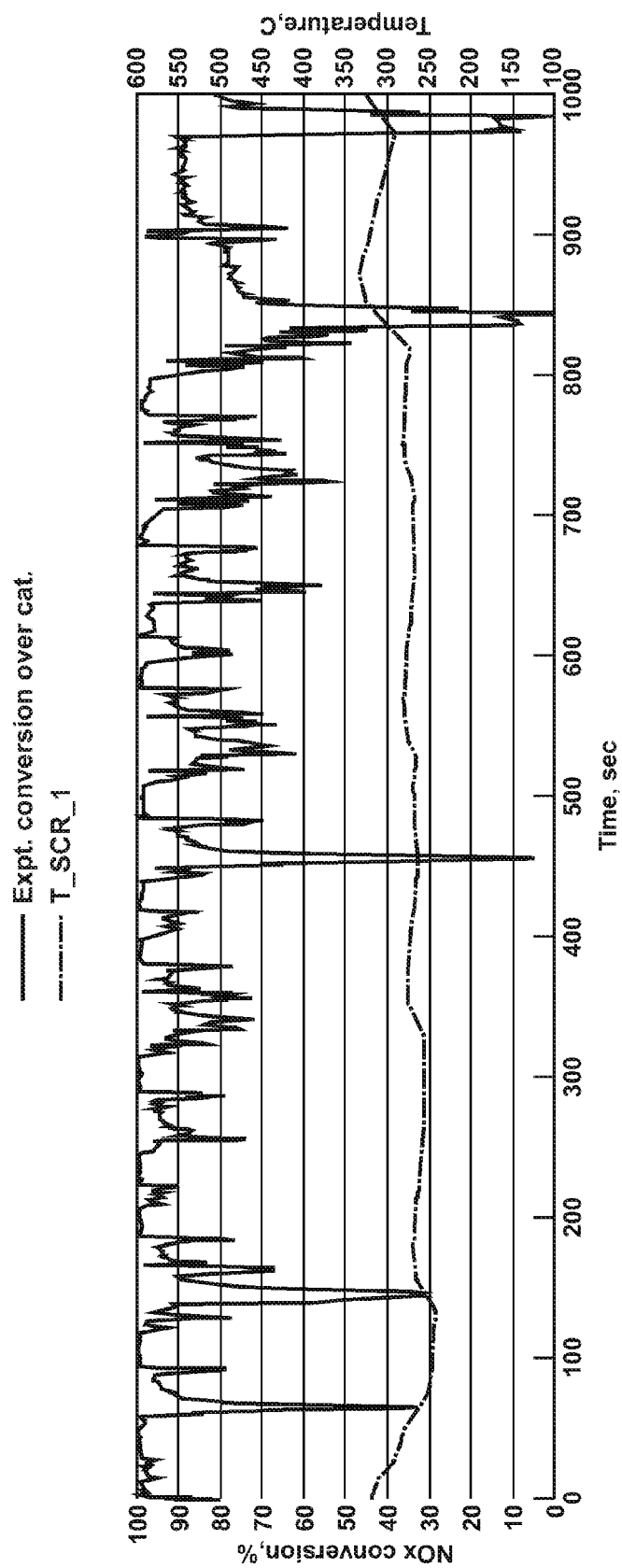
FIG. 3 graphically depicts exemplary test data describing a relationship of catalyst bed temperature to NOx conversion efficiency, in accordance with the present disclosure.

Test results can be shown to describe the relationship of various variables, including the above named variables, to conversion efficiency. FIG. 3 graphically depicts exemplary test data describing a relationship of catalyst bed temperature to NOx conversion efficiency, in accordance with the present disclosure. Temperature was monitored through a sensor located 2.5 cm from the front face of the catalyst in the HC-SCR device 60. As is evident between times 100 seconds and 200 seconds, between times 800 seconds and 900 seconds, and between times 900 seconds and 1000 seconds, increases in SCR temperature correspond to sharp drops in conversion efficiency caused, for example, by high temperature exhaust gas depleting reductant from the HC-SCR device 60. Conversion efficiency may also be affected by combustion mode transitions. For example, transitioning to homogeneous stoichiometric engine operation decreases oxygen available for conversion; thus, conversion efficiency decreases.

Figure 4:
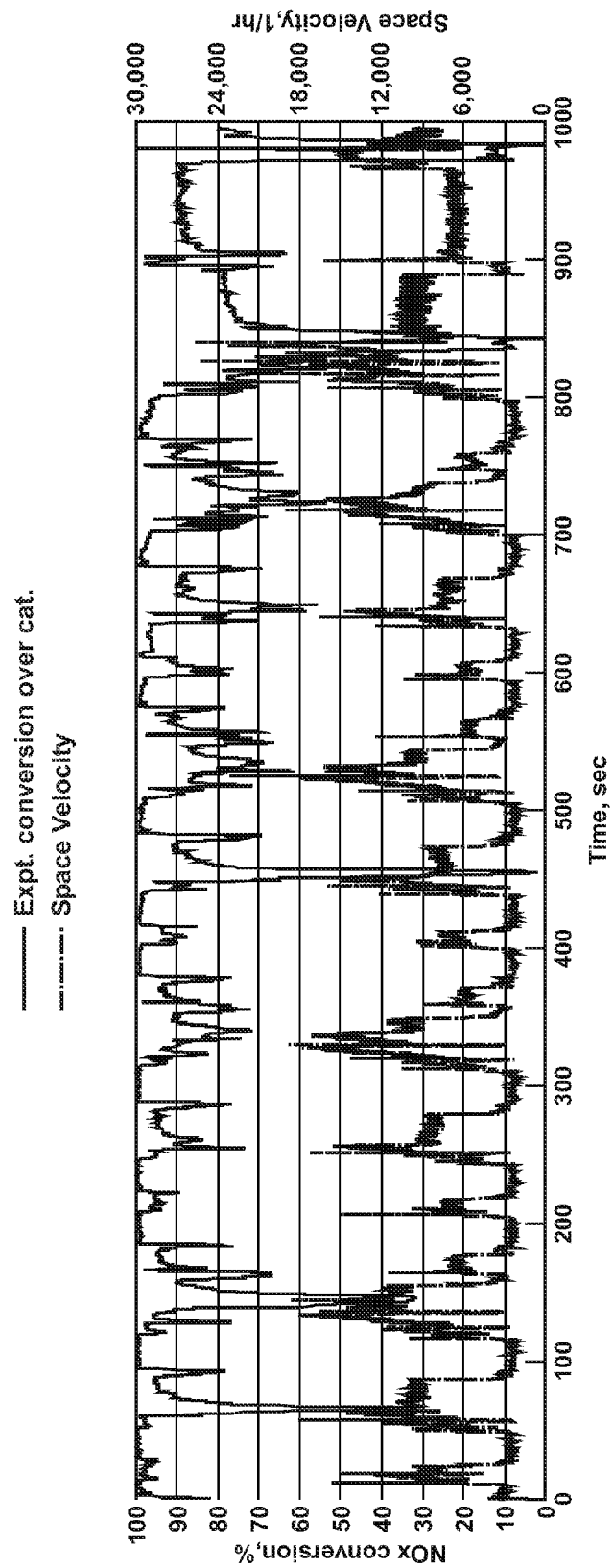
FIG. 4 graphically depicts exemplary test data describing a relationship of space velocity to NOx conversion efficiency, in accordance with the present disclosure.

FIG. 4 graphically depicts exemplary test data describing a relationship of space velocity to NOx conversion efficiency, in accordance with the present disclosure. As one skilled in the art will recognize, space velocity in the aftertreatment system may be determined based upon monitored intake air mass into the engine 10. As described above, space velocity, describing the speed at which the exhaust gas flow moves through the device, directly affects NOx conversion efficiency. The exhaust gas requires some time in the area of the catalyst for the reduction reaction to take place. Even with otherwise ideal circumstances in the device, exhaust gas forced too quickly through the device will not interact adequately with the catalyst to operate the desired reaction. As depicted in the data of FIG. 4, space velocity exceeding a certain threshold can be directly related to sharp reductions in NOx conversion efficiency.

Figure 5:
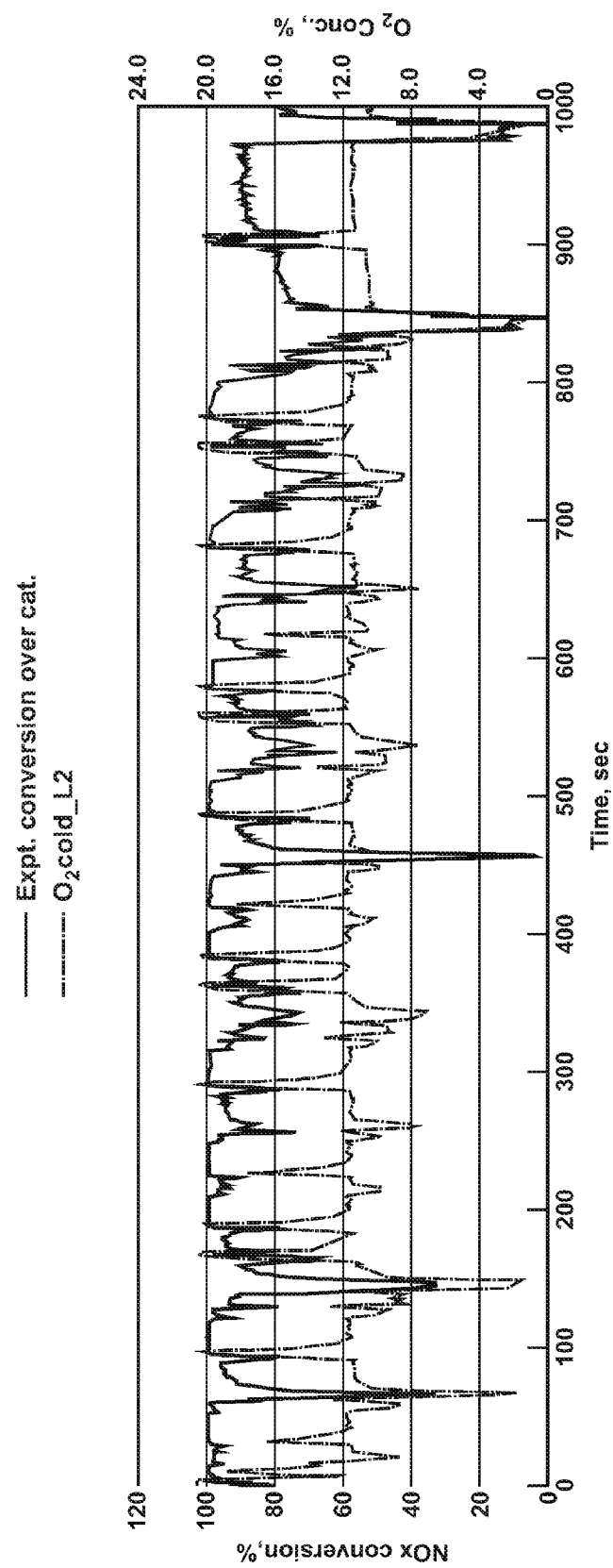
FIG. 5 graphically depicts exemplary test data describing a relationship of molecular oxygen presence to NOx conversion efficiency, in accordance with the present disclosure.

FIG. 5 graphically depicts exemplary test data describing a relationship of molecular oxygen presence to NOx conversion efficiency, in accordance with the present disclosure. As described above, presence of substances desired for the reaction must exist in sufficient quantities for high NOx conversion efficiency. As depicted in FIG. 5, significant drops in the presence of oxygen result in reductions in NOx conversion efficiency. Likewise, presence of the reductant in sufficient quantities is desired.

Figure 6:
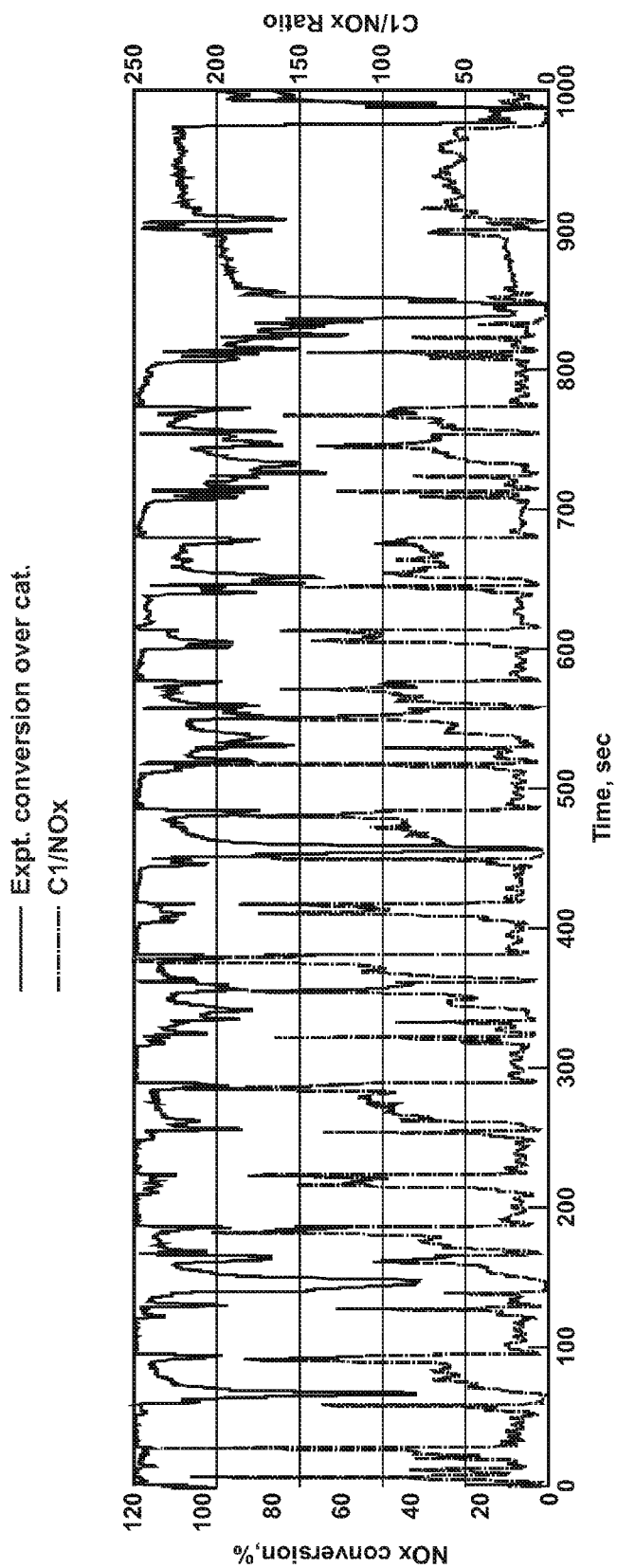
FIG. 6 graphically depicts exemplary test data describing a relationship of the ratio of hydrocarbon present to NOx present to NOx conversion efficiency, in accordance with the present disclosure.

FIG. 6 graphically depicts exemplary test data describing a relationship of the ratio of hydrocarbon present to NOx present to NOx conversion efficiency, in accordance with the present disclosure. As described above, presence of substances desired for the reaction must exist in sufficient quantities for high NOx conversion efficiency. As depicted in FIG. 6, significant drops in the ratio result in reductions in NOx conversion efficiency.

Figure 7:
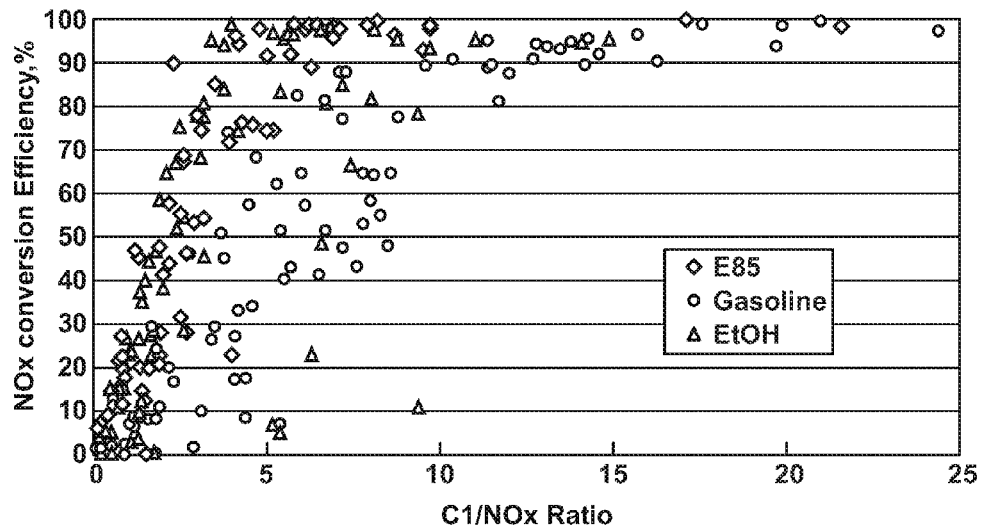
FIG. 7 graphically depicts exemplary test data describing the relationship of the ratio of hydrocarbons to NOx for a number of different hydrocarbon fuels to NOx conversion efficiency, in accordance with the present disclosure.

FIG. 7 graphically depicts exemplary test data describing the relationship of the ratio of hydrocarbons to NOx for a number of different hydrocarbon fuels to NOx conversion efficiency, in accordance with the present disclosure. The exemplary test included testing of a lean burn spark ignition direct injection test configuration at steady state at multiple engine speed and engine load points. The test configuration included a reductant injection system configured to inject a controllable reductant quantity into the exhaust gas feedstream. E85, denatured ethanol, and gasoline test results are illustrated. Each fuel shows a sharp drop in NOx conversion efficiency as the ratio drops below a certain value. As FIG. 7 indicates, increases in conversion efficiency decrease for increased reductant to NOx ratios.

Figure 8:
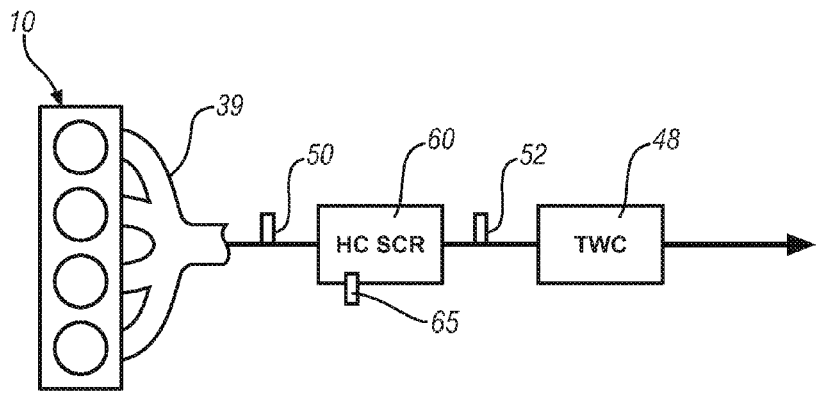
FIGS. 8-13 schematically illustrate additional exemplary configurations of the exhaust aftertreatment system, in accordance with the present disclosure.

FIGS. 8-13 schematically illustrate a number of exemplary configurations that exhaust aftertreatment system 70 can take, in accordance with the present disclosure. FIG. 8 schematically illustrates one configuration of the exhaust aftertreatment system 70 comprising the HC-SCR device 60 fluidly connected to the exhaust manifold 39 and fluidly connected upstream from the TWC 48.

Figure 9:
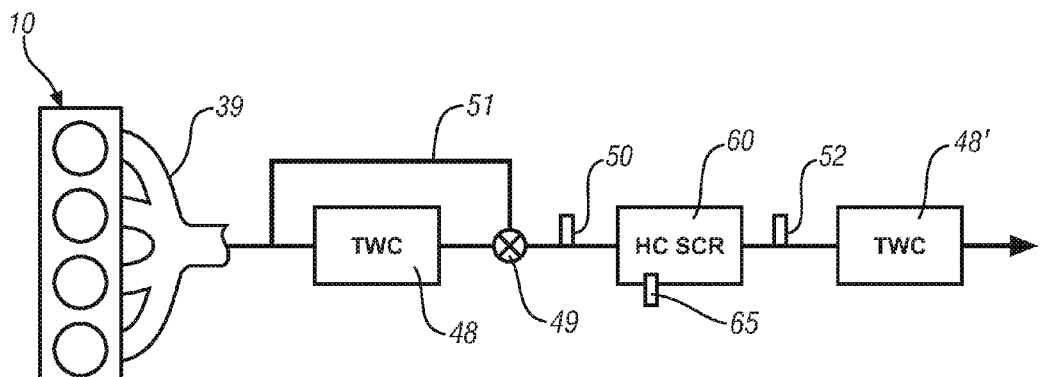

FIG. 9 schematically illustrates a second configuration of the exhaust aftertreatment system 70 comprising a first TWC 48 fluidly connected to the exhaust manifold 39 including a bypass tube 51 and a bypass valve 49. The HC-SCR device 60 is fluidly connected downstream from the TWC 48 and upstream of a second TWC 48'. One skilled in the art will appreciate that the bypass valve 49 may alternatively be connected upstream of the first TWC 48 to control the exhaust gas feedstream through the first TWC 48 or divert the exhaust gas feedstream around the first TWC 48 via the bypass tube 51.

Figure 10:
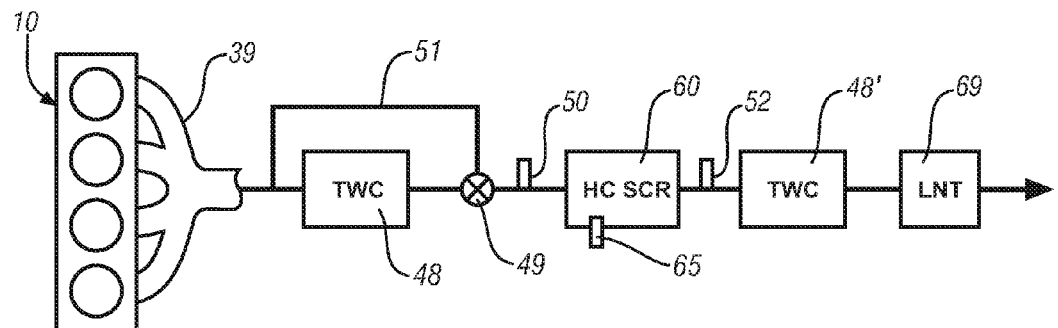

FIG. 10 schematically illustrates a third configuration of the exhaust aftertreatment system 70 comprising the second configuration of the exhaust aftertreatment system 70 further including a LNT device 69 downstream of the second TWC 48'.

Figure 11:
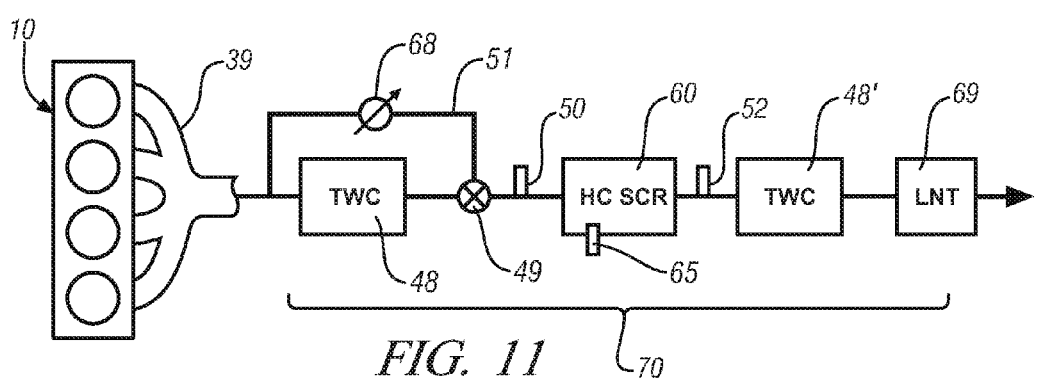

FIG. 11 schematically illustrates a fourth configuration of the exhaust aftertreatment system 70 comprising the third configuration of the exhaust aftertreatment system 70 further including a heat exchanger 68 located in the bypass tube 51.

Figure 12:
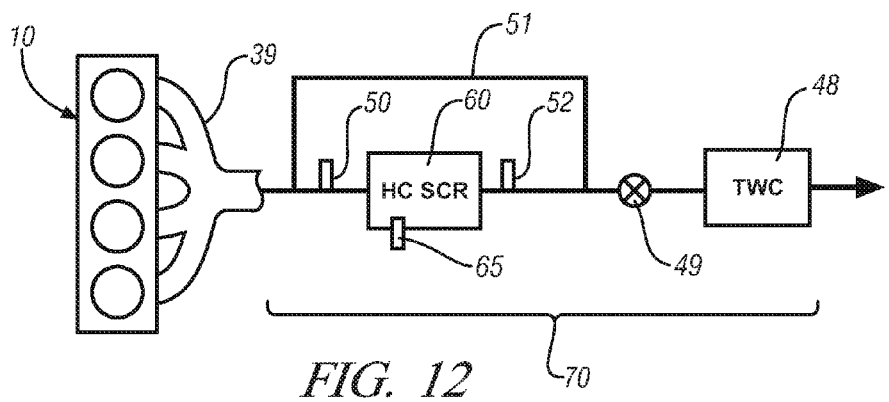

FIG. 12 schematically illustrates a fifth configuration of the exhaust aftertreatment system 70 comprising the first configuration of the exhaust aftertreatment system 70 further including the bypass tube 51 fluidly connected to the exhaust manifold 39 and the bypass valve 49. One having ordinary skill in the art will appreciate that the bypass valve 49 may alternatively be connected upstream of the HC-SCR device 60 to control the exhaust gas feedstream through the HC-SCR device 60 or divert the exhaust gas feedstream around the HC-SCR device 60 via the bypass tube 51.

Figure 13:
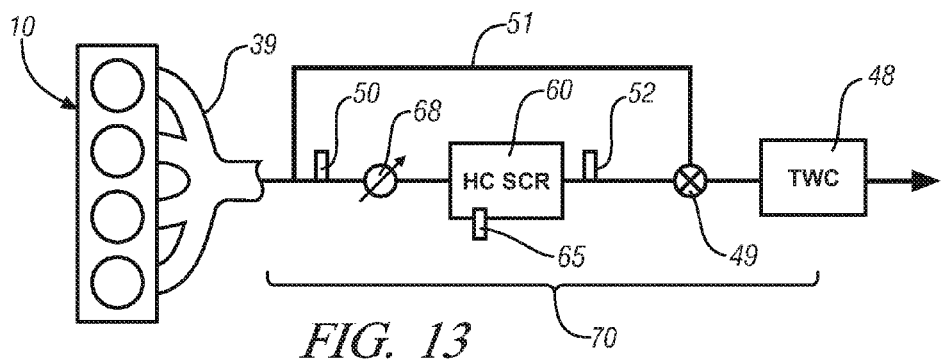

FIG. 13 schematically illustrates a sixth configuration of the exhaust aftertreatment system 70 comprising the fifth configuration of the exhaust aftertreatment system 70 further including the heat exchanger 68 located upstream of the HC-SCR device 60.

As described above, a number of factors act upon NOx conversion efficiency of an HC-SCR operating to convert NOx into other substances. One of the factors desired for optimized or sufficiently efficient conversion is delivery of a proper amount of hydrocarbons to the HC-SCR device, either as a component of the exhaust gas flow as an engine out emission or through active dosing through a fuel injection device within the aftertreatment system. Control of hydrocarbon delivery requires an estimate of the proper amount of hydrocarbon desired to operate the desired reaction. Too little delivery of hydrocarbon, causing starving of the desired reaction, results in lowered NOx conversion efficiency of the device. Too great delivery of hydrocarbon wastes fuel and can in some circumstances result in lowered NOx conversion efficiency.

A computerized model of the reaction process occurring within the HC-SCR device, including real-time inputs of all critical factors affecting NOx conversion efficiency within the device and operating in a capable processor, could be utilized to control hydrocarbon delivery in real time. However, a computational load associated with operating such a complex model, predicting in real-time a fuel injection quantity either in the combustion chamber or in the aftertreatment system, may not be desirable. However, methods are known in statistical modeling to estimate behavior of a system according to gross categorization of system operation. Through calibration or analysis of exemplary system operation, a statistical prediction of system operation can be made based upon quickly sorting or categorizing monitored inputs to the system. Such predictive results can be used to limit the controlled variable or target real-time calculations to a particularly useful input in controlling the variable without utilizing a full computational model. A method for controlling hydrocarbon delivery to a hydrocarbon selective catalytic reduction device is disclosed, wherein operative inputs are monitored in real-time, these inputs are categorized according to a calibrated statistical process model in order to predict desired delivery of hydrocarbons.

By identifying variables that strongly affect NOx conversion efficiency of an HC-SCR device, these variables can be tested on an exemplary experimental system including an exemplary HC-SCR device in order to statistically predict operation of an operably similar system. For example, as described above, catalyst bed temperature, space velocity within the device, and presence in appropriate quantities of molecular oxygen, NOx, and hydrocarbons have been identified in testing as controlling variables in an exemplary system utilizing a silver based catalyst to reduce NOx using gasoline as a reductant. These controlling variables combine to affect the output of the model, i.e. NOx conversion efficiency. Catalyst bed temperature, space velocity, and presence of oxygen and NOx, are predictive inputs to the disclosed statistical model. The output of the model, NOx conversion efficiency, is a quantity to be optimized through the model. Variation of any selectable inputs is optimized to achieve the highest output or NOx conversion efficiency possible. The remaining variable, presence of hydrocarbons or the delivery of hydrocarbons to the HC-SCR device 60, is a quantity to be selected through operation of the statistical model in order to achieve a desired NOx conversion efficiency. This variable, the delivery of hydrocarbons to be delivered to the HC-SCR, will be output as a range of values likely to deliver the desired conversion efficiency and can be described as a desired hydrocarbon delivery value range.

Figure 14:
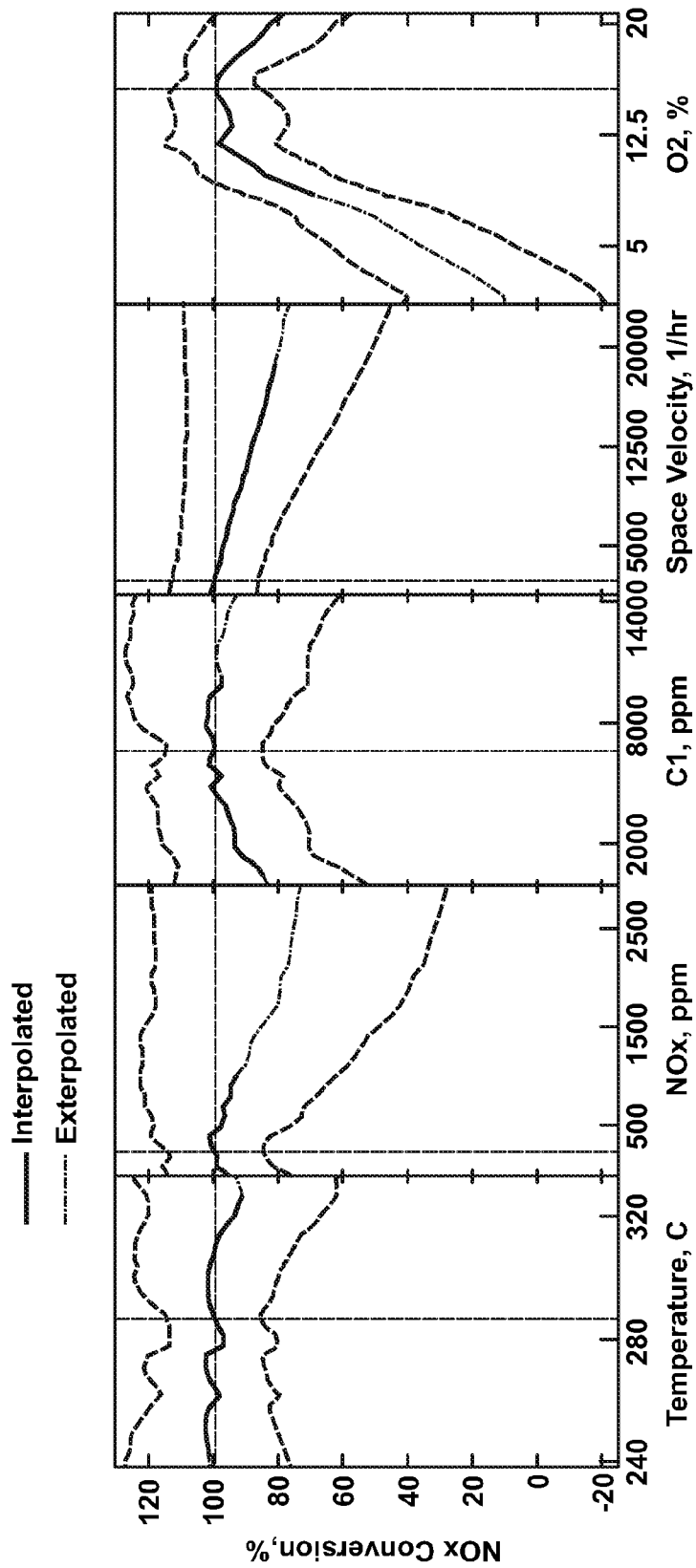
FIG. 14 graphically depicts operation of an aftertreatment system, describing through stochastic analysis operation of a number of interrelated variable affecting NOx conversion efficiency, in accordance with the present disclosure.

An exemplary method to select a desired hydrocarbon delivery value range through a statistical model is disclosed. FIG. 14 graphically depicts exemplary test values plotted according to statistical analysis, in particular, through stochastic analysis, in accordance with the present disclosure. Stochastic analysis is a method known in the art wherein variability in a term is plotted with test values and projected values, and outputs in subsequent iterations of operation for variation in the term are plotted within 95% certainty ranges. In this particular graph, stochastic graphs for tested controlling variables are plotted in a single larger graph, illustrating statistically predicted effects of the different variables on a resulting single NOx conversion efficiency, depicted on the graph by a horizontal line. Ranges of values for catalyst bed temperature, space velocity, and presence of oxygen, NOx, and hydrocarbons are plotted. Each variable value at the current operating point is depicted by a vertical line. Holding any other variables steady, resulting values of NOx conversion efficiency can be predicted for a single variable. A centerline prediction and 95% bands are predicted for each variable. The form of the centerline depicts whether the data has been experimentally tested (solid) or predicted (dash-dot) based upon experimentally tested regions. For example, given the current $O_2$ concentration pictured in the graph and holding all other variables steady, a drop in $O_2$ concentration will predictably create a drop in NOx conversion efficiency.

Stochastic analysis as described in association with FIG. 14 provides an ability to predictively describe operation of an HC-SCR device, utilizing a set of measurable variables to predict an optimal delivery of a single input variable in order to achieve a maximum NOx conversion efficiency. In the example of FIG. 14, requiring near 100% conversion efficiency and measuring the other variables to the values depicted, an optimal range of Cl or carbon presence due to HC introduced can be selected approximately between 5,000 and 12,000 ppm. Such results can be iteratively predicted, with varying ranges of the measurable variables plotted against desired ranges of hydrocarbon delivery. By compiling such results through selective ranges of operation, desired hydrocarbon delivery value ranges can be used to control introduction of HC to the HC-SCR 60 in order to achieve the desired NOx conversion efficiency.

As described above, combustion control introducing a specific quantity of HC to be injected or HC injection control introducing a specific amount of HC to the HC-SCR 60 are real-time calculations, requiring short lag times between measurement and output of the desired HC term. However, operation of a computer model taking values of the variables affecting NOx conversion efficiency and generating a desired HC number through the model in real-time is computationally prohibitive. Analysis of stochastic analyses can be used instead to characterize ranges of measurable input values that create predictable behavior in the desired hydrocarbon delivery value. An exemplary method to analyze stochastic predictions of HC-SCR operation includes modulating one measurable variable term at a time through a range of values, examining for each iteration an effect on the desired hydrocarbon delivery value, and identifying breakpoints in the data, wherein values above the breakpoint in the measurable variable term result in desired hydrocarbon delivery values in one range, and values below the breakpoint in the measurable variable term result in desired hydrocarbon delivery values in a different range. This breakpoint can then be used to define a measurable variable range. For instance, space velocity can be classified by an identified breakpoint into a high range and a low range, wherein measured space velocity values in each range can be utilized to predict corresponding behavior of a desired hydrocarbon delivery value range. By characterizing and classifying measurable variable terms identified to be the most influential factors upon conversion efficiency into measurable variable ranges, operational measurements of the measurable variable terms can be used to statistically predict desired hydrocarbon delivery value range.

The above process can be used to describe a desired hydrocarbon delivery value range for variation in one term. However, multiple terms can be identified as an influential factor to HC-SCR operation and tracked as measurable variable terms. Iterative analysis of each of the measurable variable terms and breakpoints identified in each of the terms can be used to describe the interdependency of the different terms. For example, if $O_2$ concentration is in the low range and space velocity is also in the low range, then desired hydrocarbon delivery value can be predicted in a first range. However, if space velocity is instead in its high range, then the desired hydrocarbon delivery value can be predicted in a second range. In this way, variation in a plurality of measurable variable terms identified as most influential factors on HC-SCR operation can be mapped or charted, such that sorting real-time measurements of the measurable variable terms can be used to predict desired hydrocarbon delivery value range based upon the interdependence of the measurable variable terms.

Measurable variable ranges can be fixed ranges, with an identified breakpoint held to a single value through all comparisons. This embodiment has the advantage of simplicity, wherein the classifying of real-time measurements into measurable variable ranges can be performed in parallel. In the alternative, if a breakpoint of one measurable variable term is dependent upon or sensitive to the value of another term, then the particular ranges of the dependent term can be made dependent upon the measurement of the first, independent term.

As described above, measurable variable terms can be divided by identified breakpoints into measurable variable ranges. As described above, these ranges can divide possible values of the measurable variable terms into two ranges including a high range and a low range. Alternatively, based upon behaviors in the data or requirements for finer resolution in the desired hydrocarbon delivery value range, a plurality of breakpoints can be identified in the data. For example, space velocity can be divided into three ranges and temperature can be divided into four. It will be appreciated that each increase in the number of ranges creates a greater number of combinations of measurable variable ranges to be calibrated and tracked. Real-time measurements of the measurable variable terms can be monitored and classified according to measurable variable ranges.

Figures 15, 16:
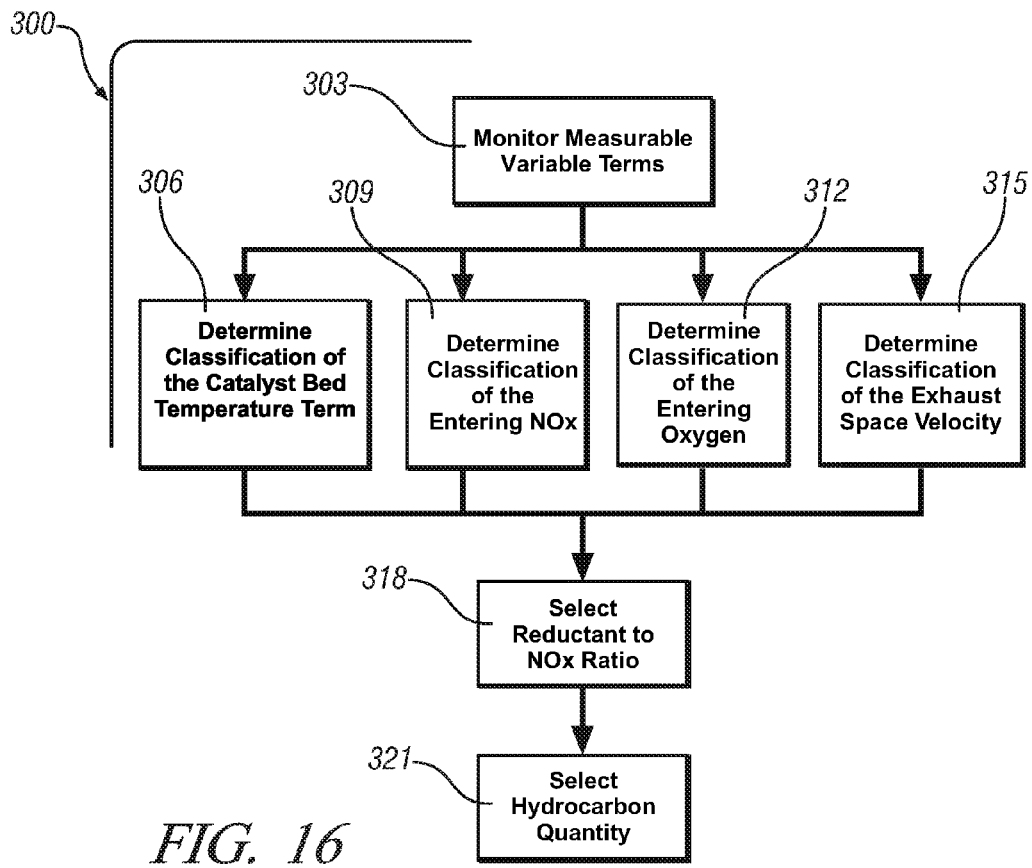
FIG. 15 depicts an exemplary lookup table describing measurable variable ranges and corresponding desired hydrocarbon delivery value ranges, in accordance with the present disclosure.
FIG. 16 shows a control scheme for managing an exhaust gas feedstream from the engine, in accordance with the present disclosure.

FIG. 15 depicts an exemplary lookup table describing measurable variable ranges and corresponding desired hydrocarbon delivery value ranges, in accordance with the present disclosure. The exemplary lookup table comprises four classifications of the measurable variable terms arranged in columns and an additional column for the desired hydrocarbon delivery value range (Reductant/NOx). The classifications of the measurable variable terms correspond to the measurable variable ranges described above. In the exemplary lookup table, each classification of the measurable variable term is represented by a high range and a low range. The classifications of the measurable variable term are determined based upon the measurable variable range as described herein above. Each row of the classifications of the measurable variable terms corresponds to a desired hydrocarbon delivery value range. Each row comprises classifications for each of the measurable variable terms and each row comprises a different set of classifications of the measurable variable terms. A catalyst bed temperature term (T) is represented in a first column. NOx molecules entering the aftertreatment system 70 are represented by a NOx molecules term in a second column. A space velocity term (SV) is represented in a third column. Oxygen molecules present in the exhaust gas feedstream ($O_2$) are represented by an oxygen molecules term in a fourth column. The desired hydrocarbon delivery value range for each row is represented in a fifth column.

FIG. 15 describes a look-up table wherein calibrated values for the described methods can be recorded and made available for look-up. It will be appreciated that a number of look-up tables can be used for various ranges of operation. Additionally, it will be appreciated that the behaviors of the various ranges and resulting output values can be captured in programming or functional relationships and utilized without a look-up table. Many process embodiments to utilize the disclosed methods are envisioned, and the disclosure is not intended to be limited to the particular embodiments described herein.

In one embodiment, the measurable variable terms are divided into two measurable variable ranges. A first measurable variable range for the catalyst bed temperature term comprises temperatures between 0° C. and 290° C. A second measurable variable range for the catalyst bed temperature term comprises temperatures between 290° C. and higher. A first measurable variable range for the NOx molecules term comprises NOx molecules between 0 and 300 ppm in the exhaust gas feedstream. A second measurable variable range for the NOx molecules term comprises NOx molecules between 300 ppm and higher. A first measurable variable range for the space velocity term comprises 0 and 8000/hr. A second measurable variable range for the space velocity term comprises between 8000/hr and higher. A first measurable variable range for the oxygen molecules term comprises oxygen concentration between 0% and 11% in the exhaust gas feedstream. A second measurable variable range for the oxygen molecules term comprises oxygen concentration between 11% and 100%.

FIG. 16 shows a control scheme 300 for managing an exhaust gas feedstream from the engine 10 during ongoing engine operations, in accordance with the present disclosure. The control scheme 300 is illustrated in FIG. 16, and described herein as comprising discrete elements. Such illustration is for ease of description and it should be recognized that the functions performed by these elements may be combined in one or more devices, e.g., implemented in software, hardware, and/or application-specific integrated circuitry. For example, the control scheme 300 may be executed as one or more algorithms in the control module 5. The control scheme 300 comprises monitoring the measurable variable terms in block 303. As described herein above, the measurable variable terms include the catalyst bed temperature, space velocity, oxygen molecules present in the exhaust gas feedstream, and NOx molecules present in the exhaust gas feedstream.

The control scheme 300 further comprises determining classifications of the measurable variable terms within the measurable variable ranges calibrated by the statistical analysis according to the breakpoints in blocks 306, 309, 312, and 315.

After selecting the classifications of each of the measurable variable terms, the control scheme 300 determines the desired hydrocarbon delivery value range in block 318. The desired hydrocarbon delivery value range is determined based upon the classifications of the measurable variable terms. The desired hydrocarbon delivery value range is a predetermined value range corresponding to the classifications of each of the measurable variable terms. In one embodiment the desired hydrocarbon delivery value range is determined by locating the classifications of the measurable variable terms in a lookup table. The desired hydrocarbon delivery value range is the value range associated with the classifications of the measurable variable terms. For example, using the exemplary lookup table depicted in FIG. 15, a low classification for the catalyst bed temperature term, a low classification for the space velocity term, a low classification for the oxygen molecules term, and a low classification for the NOx molecules term corresponds to a desired Cl/NOx ratio hydrocarbon value range of 29 to 88.

After determining the desired Cl/NOx ratio hydrocarbon value range, the control scheme 300 determines a quantity of fuel within this range for hydrocarbon delivery to the HC-SCR device 60 in block 321. The above methods describe identifying a desired hydrocarbon delivery value range, describing a range in which a desired NOx conversion efficiency can be achieved in the associated HC-SCR. The value within the range may be developed experimentally, empirically, predictively, through modeling or other techniques adequate to accurately predict HC-SCR operation and effects of the HC delivery on other affected systems, and a multitude of calibration curves might be used by the same system for different settings, conditions, or operating ranges. One exemplary criterion, in order to maximize fuel economy, can include selecting the lowest HC value in the desired hydrocarbon delivery value range. Other criteria can additionally or alternatively be applied according to methods known in the art. After determining the quantity of fuel for hydrocarbon delivery, the control scheme 300 may effect the hydrocarbon delivery to the HC-SCR device 60. As described herein above, hydrocarbon delivery to the HC-SCR device 60 may be effected by injection in the combustion chamber and/or injection into the exhaust gas flow.

The above methods describe a manual calibration process wherein an exemplary test system is used to evaluate operation through changes in each of the measurable variable terms. The resulting measurable variable ranges are then utilized as programmed ranges in systems utilizing operably similar HC-SCR devices. However, it will be appreciated that through adaptive systems, such as systems employing machine learning algorithms or fuzzy logic, systems can be configured to test and adapt the measurable variable ranges and corresponding desired hydrocarbon delivery value ranges to operation of the vehicle, including particular operation of the HC-SCR as confirmed by NOx sensors or other methods of evaluating NOx conversion efficiency and including compensating for effects of aging or damaged components of the system.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling hydrocarbon delivery to a hydrocarbon selective catalytic reduction device configured to receive an exhaust gas flow from an internal combustion engine, comprising:

monitoring measurable variable terms including factors affecting a conversion efficiency in the hydrocarbon selective catalytic reduction device, the terms comprising:

a temperature of a catalyst within the device;

a space velocity of the exhaust gas flow moving through the device;

an oxygen concentration of the exhaust gas flow; and a NOx concentration of the exhaust gas flow;

determining classifications of the terms based upon measurable variable ranges selected through statistical analysis of the terms, the analysis comprising:

changing in iterations one of the terms at a time through a range of values;

for each iteration, examining an effect on the conversion efficiency;

identifying breakpoints in the terms; and defining the measureable variable ranges based upon the breakpoints;

determining a desired hydrocarbon delivery value range based upon the classifications; and utilizing the desired hydrocarbon delivery value range to control the hydrocarbon delivery to the hydrocarbon selective catalytic reduction device.

2. The method of claim 1, wherein the classifications comprise a high range and a low range from each of the measurable variable terms.

3. The method of claim 1, wherein utilizing the desired hydrocarbon delivery value range to control the hydrocarbon delivery comprises injecting a fuel upstream of the hydrocarbon selective catalytic reduction device.

4. The method of claim 1, wherein utilizing the desired hydrocarbon delivery value range to control the hydrocarbon delivery comprises controlling a fuel injection into a combustion chamber of the engine to generate the exhaust gas flow with an air/fuel ratio rich of stoichiometry.

5. The method of claim 4, wherein controlling a fuel injection into a combustion chamber of the engine comprises executing multiple fuel injections to generate the exhaust gas flow with an air/fuel ratio rich of stoichiometry.

6. The method of claim 4, wherein controlling a fuel injection into a combustion chamber of the engine comprises adjusting a fuel injection timing to generate the exhaust gas flow with an air/fuel ratio rich of stoichiometry.

7. The method of claim 1, wherein utilizing the desired hydrocarbon delivery value range to control the hydrocarbon delivery comprises controlling a spark timing to generate the exhaust gas flow with an air/fuel ratio rich of stoichiometry.

8. The method of claim 1, wherein the hydrocarbon delivery to the hydrocarbon selective catalytic reduction device is a lowest value of the desired hydrocarbon delivery value range.

9. Apparatus for controlling hydrocarbon delivery to a hydrocarbon selective catalytic reduction device configured to receive an exhaust gas flow from an internal combustion engine, the apparatus comprising:

the hydrocarbon selective catalytic reduction device;
a fuel delivery system controlling an amount of hydrocarbons delivered to the hydrocarbon selective catalytic reduction device; and
a control module
   monitoring measurable variable terms including factors affecting a conversion efficiency in the hydrocarbon selective catalytic reduction device, the terms comprising:
     a temperature of a catalyst within the device;
     a space velocity of the exhaust gas flow moving through the device;
     an oxygen concentration of the exhaust gas flow; and
     a NOx concentration of the exhaust gas flow;
   determining classifications of the measurable variable terms based upon measurable variable ranges selected through statistical analysis of the terms, the analysis comprising:
     changing in iterations one of the terms at a time through a range of values;
     for each iteration, examining an effect on the conversion efficiency;
     identifying breakpoints in the terms; and
     defining the measureable variable ranges based upon the breakpoints;
   determining the desired hydrocarbon delivery value range based upon the classifications; and
   utilizing the desired hydrocarbon delivery value range to control the fuel delivery system.

10. The apparatus of claim 9, wherein the classifications comprise a high range and a low range from each of the measurable variable terms.

11. Method for controlling hydrocarbon delivery to a hydrocarbon selective catalytic reduction device configured to receive an exhaust gas flow from an internal combustion engine, the method comprising:
   iteratively testing measurable variable terms in an exemplary hydrocarbon selective catalytic reduction device, the measurable variable terms including a) temperature of a catalyst within the hydrocarbon selective catalytic reduction device, b) a quantity of NOx entering into the hydrocarbon selective catalytic reduction device, c) a space velocity of the exhaust gas flowing through the hydrocarbon selective catalytic reduction device, and d) a quantity of molecular oxygen entering into the hydrocarbon selective catalytic reduction device;
   monitoring in each test a corresponding hydrocarbon quantity desired to be present in the hydrocarbon selective catalytic reduction device;
   determining through stochastic analysis breakpoints for each of the measurable variable terms describing changes in trends of the hydrocarbon quantity desired to be present corresponding to changes in the measurable variable terms;
   utilizing the breakpoints to determine measurable variable ranges for each of the measurable variable terms; and
   utilizing the measurable variable ranges to control hydrocarbon delivery in an operably similar hydrocarbon selective catalytic reduction device based upon measured values of the measurable variable terms;
   wherein the stochastic analysis comprises plotting variability in each term with test values and projected values, with the variability in each term plotted within 95% certainty ranges.

12. The method of claim 1, wherein the classifications comprise one of a plurality of ranges from each of the measurable variable terms.

13. The method of claim 1, wherein the statistical analysis comprises stochastic analysis comprising plotting variability in each term with test values and projected values, with the variability in each term plotted within 95% certainty ranges.

14. The method of claim 1, further comprising:
   monitoring a combustion mode transition; and
   determining an effect of the combustion mode transition on the conversion efficiency.

15. The method of claim 1, wherein determining the desired hydrocarbon delivery value range comprises utilizing a reference table with the classifications of each of the temperature, the space velocity, the oxygen concentration, and the NOx concentration as inputs to the table and the desired hydrocarbon delivery value range as an output to the table.

16. The apparatus of claim 9, further comprising a three-way catalyst.

* * * * *